United States Patent
Liu et al.

(10) Patent No.: US 12,418,510 B2
(45) Date of Patent: Sep. 16, 2025

(54) SYSTEMS AND METHODS FOR REQUEST GOVERNANCE IN MULTI-TENANCY CLOUD ARCHITECTURE

(71) Applicant: SAP SE, Walldorf (DE)

(72) Inventors: Kun Liu, Shanghai (CN); Xia Yu, Shanghai (CN); Shuna Ye, Shanghai (CN); Chen Feng, Shanghai (CN); Xiansheng Sun, Shanghai (CN)

(73) Assignee: SAP SE, Walldorf (DE)

( * ) Notice: Subject to any disclaimer, the term of this patent is extended or adjusted under 35 U.S.C. 154(b) by 145 days.

(21) Appl. No.: 18/501,383

(22) Filed: Nov. 3, 2023

(65) Prior Publication Data

US 2025/0150437 A1 May 8, 2025

(51) Int. Cl.
*H04L 9/40* (2022.01)

(52) U.S. Cl.
CPC ...... *H04L 63/0263* (2013.01); *H04L 63/1416* (2013.01); *H04L 63/1425* (2013.01)

(58) Field of Classification Search
CPC ............. H04L 63/0263; H04L 63/1416; H04L 63/1425
See application file for complete search history.

(56) References Cited

U.S. PATENT DOCUMENTS

| | | | | |
|---|---|---|---|---|
| 11,159,545 | B2 * | 10/2021 | Higbee | H04L 63/1416 |
| 11,163,586 | B1 * | 11/2021 | Mathur | G06F 9/3836 |
| 2019/0123983 | A1 * | 4/2019 | Rao | H04L 41/0893 |
| 2020/0241864 | A1 * | 7/2020 | Duvur | G06F 8/65 |
| 2021/0021612 | A1 * | 1/2021 | Higbee | H04L 63/1416 |
| 2024/0236017 | A1 * | 7/2024 | Guim Bernat | H04L 47/805 |
| 2024/0250970 | A1 * | 7/2024 | Lai | H04L 63/1416 |

\* cited by examiner

*Primary Examiner* — Cheng-Feng Huang
(74) *Attorney, Agent, or Firm* — Buckley, Maschoff & Talwalkar LLC

(57) ABSTRACT

According to some embodiments, methods and systems may provide request governance in a multi-tenancy cloud computing environment of an enterprise. A default cluster and a quarantine cluster may each execute application servers, and an automated quarantine enterprise configuration may store automatically managed tenant identifiers. An automated quarantine manager may automatically determine which tenant identifiers are stored in the automated quarantine enterprise configuration (e.g., based on a dynamic sliding time window). The automated quarantine manager may receive a tenant request from a client and arrange for the received tenant request to be executed by an application server in either the default cluster or the quarantine cluster in accordance with an associated tenant identifier in the automated quarantine enterprise configuration.

20 Claims, 20 Drawing Sheets

| INDICATOR 1702 | INDICATOR VALUE 1704 | WEIGHT 1706 | WEIGHT VALUE 1708 | TENANT WEIGHT 1710 |
|---|---|---|---|---|
| IND_1 | 0.3 | W_1 | 0.3 | 0.37 |
| IND_2 | 0.2 | W_5 | 0.1 | |
| IND_3 | 0.35 | W_3 | 0.4 | |
| IND_4 | 0.5 | W_4 | 0.1 | |
| IND_5 | 0.7 | W_5 | 0.1 | |

*FIG. 17*

SYSTEMS AND METHODS FOR REQUEST GOVERNANCE IN MULTI-TENANCY CLOUD ARCHITECTURE

BACKGROUND

An enterprise may utilize a cloud computing environment to let users perform tasks. For example, the enterprise might let various users execute an application via the cloud computing environment to process purchase orders, adjust human resources information, generate invoices, etc. With the advent of cloud technologies and the benefits of usage-based pricing for cost-effectiveness, organizations are rapidly transitioning workloads to such cloud infrastructures. Cloud infrastructure providers (and container orchestration technologies such as Kubernetes) offer tooling and orchestration to implement such a cloud-based computing environment. Moreover, multi-tenancy is an architectural pattern where a shared set of physical resources is used to accommodate workloads (for multiple customers or tenants) without compromising logical isolation between the workloads. A multi-tenant system (e.g., for fifty tenants) is expected to ensure a near-complete degree of logical isolation with varying degrees of physical isolation and is usually tolerant towards co-tenant monopoly issues (otherwise known as the "noisy-neighbor" problem or "problematic tenant"). For example, if a first tenant's application experiences a problem that causes it to consume a large amount of computing resources, that may adversely impact a second tenant who shares those resources.

FIG. 1 illustrates a typical process 100 to manually isolate or quarantine a problematic tenant. At S110, a monitoring alert may involve an operational team receiving a backend server monitoring alert. The team may then perform a first analysis to determine whether the problem is an environmental issue or an application issue. If it is an application issue, at S120 a cross team analysis may involve the operational team analyzing a server log to determine which module process is causing the problem. The team can then call the module owner and do further analysis. In a normal case, multiple modules are called during this stage and it can take hours or even days to find the root cause and implement an appropriate solution. After the cross team analysis, if it is confirmed that the issue is caused by a problematic tenant, the operational team manually puts that tenant in a quarantine cluster at S130.

For example, FIG. 2 illustrates a system 200 to manually quarantine a problematic tenant. An Application Programming Interface ("API") gateway 220 may receive an application request from a client 210. The API gateway 220 may include a request parser 222 and a manual quarantine manager 224 and communicate with a manual quarantine enterprise configuration 250. In the example of FIG. 2, the manual quarantine enterprise configuration 250 is storing an indication that tenant A has been manually flagged as a problematic tenant (quarantineCluster: ["tenantA"]). As a result, client 210 requests associated with tenant A are handled by application servers 242 in a quarantine cluster 240 while requests associated with tenants B and C are handled by application servers 232 in a default cluster 230. That is, the backend servers are divided into different clusters 230, 240 logically and the API gateway 220 routes the request to appropriate cluster 230, 240 in accordance with the tenant identifier associated with each request.

Note that in a production environment, many server issues may be caused by tenant API abuse (e.g., a corner case triggered by tenant configuration or dirty data). Such issues may cause the server to become abnormal status and adversely impact all tenants (since all of the tenants share the same backend servers). To solve this problem, the backed servers are divided into multiple clusters 230, 240 logically. Problematic tenants are manually identified and requests associated with those tenants are routed to the quarantine cluster 240 (while other requests are routed to the default cluster 230) to reduce the impact of problematic tenants. Note that routing by tenant may also support a tenant exclusive cluster for stability purposes or issue investigation purposes. The biggest problem with this approach is that the process takes too much time, and during this period all of the customers may experience problems.

It would therefore be desirable to provide automated request governance in a multi-tenancy cloud computing environment.

SUMMARY

According to some embodiments, methods and systems may provide request governance in a multi-tenancy cloud computing environment of an enterprise. A default cluster and a quarantine cluster may each execute application servers, and an automated quarantine enterprise configuration may store automatically managed tenant identifiers. An automated quarantine manager may automatically determine which tenant identifiers are stored in the automated quarantine enterprise configuration. The automated quarantine manager may receive a tenant request from a client and arrange for the received tenant request to be executed by an application server in either the default cluster or the quarantine cluster in accordance with an associated tenant identifier in the automated quarantine enterprise configuration.

Some embodiments comprise means for automatically determining, by a computer processor of an automated quarantine manager, which tenant identifiers are stored in an automated quarantine enterprise configuration; means for receiving a tenant request from a client; and means for arranging for the received tenant request to be executed by an application server in either a default cluster or a quarantine cluster in accordance with an associated tenant identifier in the automated quarantine enterprise configuration.

Some technical advantages of some embodiments disclosed herein are improved systems and methods to provide automated request governance in a multi-tenancy cloud computing environment.

BRIEF DESCRIPTION OF THE DRAWINGS

FIG. 17 is a tabular portion of a tenant weight database in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components, and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
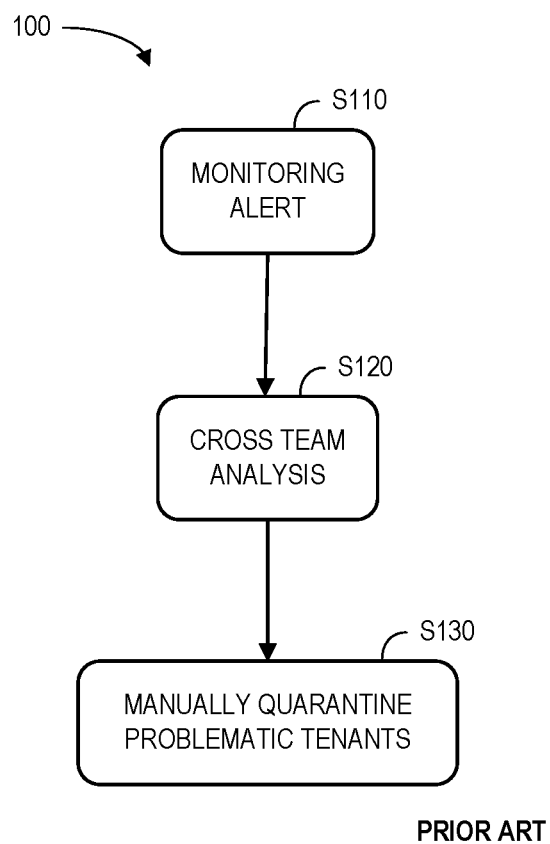
FIG. 1 illustrates a typical process to manually quarantine a problematic tenant.
Figure 2:
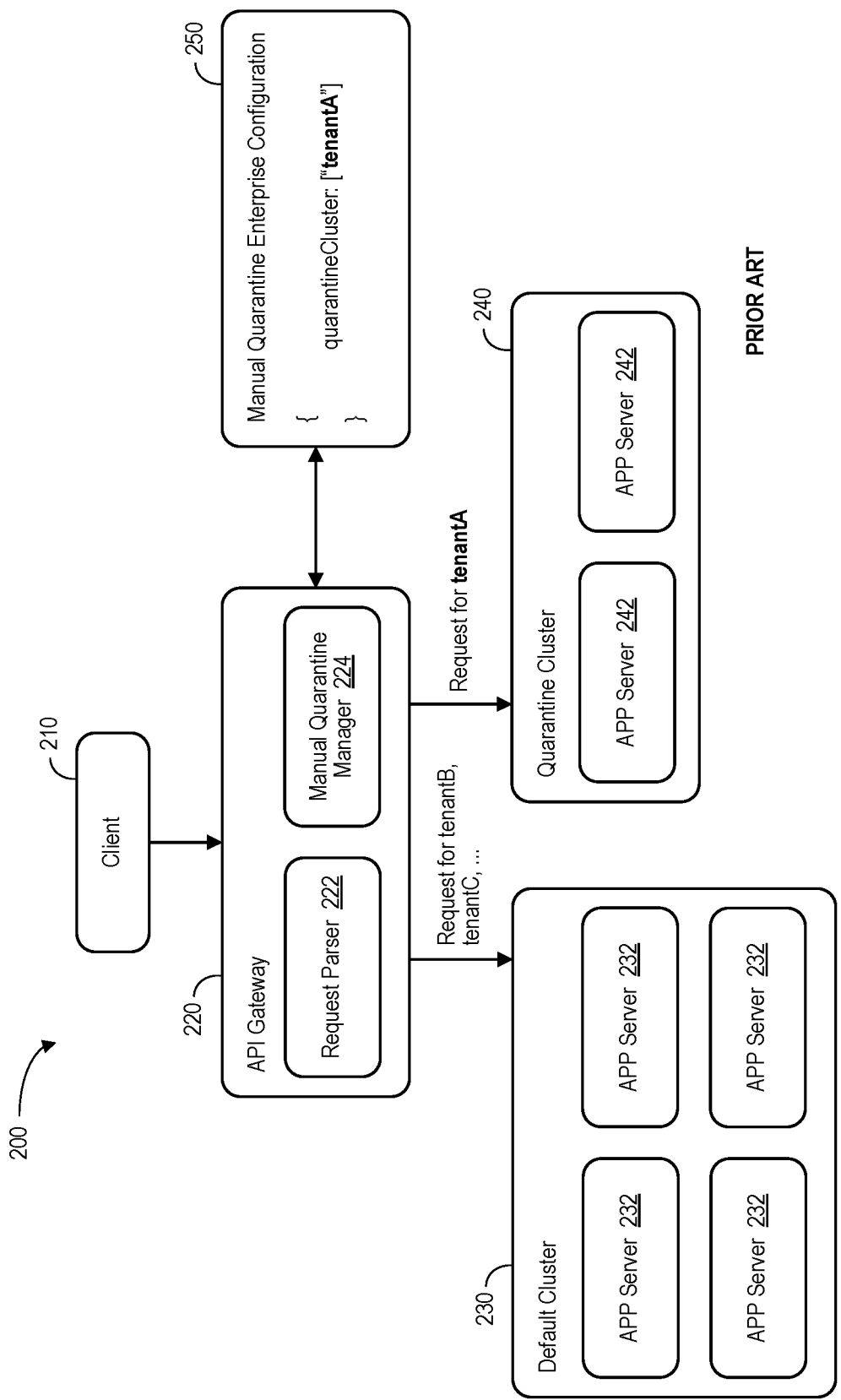
FIG. 2 illustrates a system to manually quarantine a problematic tenant.
Figure 3:
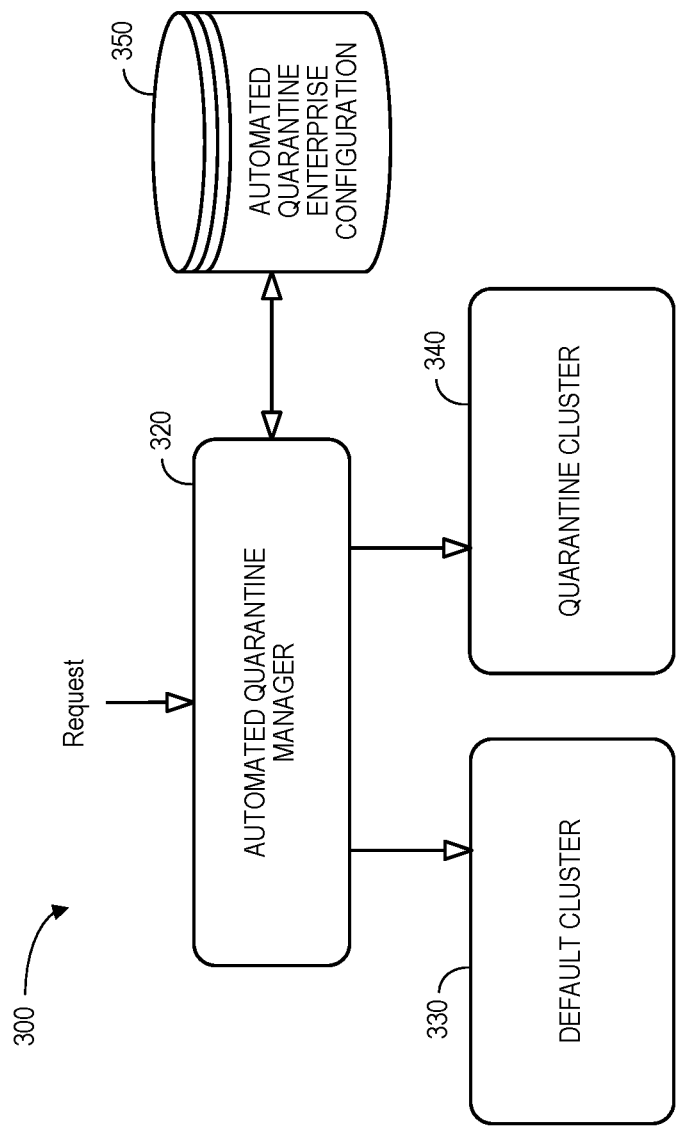
FIG. 3 is a high-level block diagram associated with a cloud-based computing system in accordance with some embodiments.

FIG. 3 is a high-level block diagram associated with a cloud-based computing system 300 in accordance with some embodiments. The system 300 may include an automated quarantine manager 320 that receives a request and exchanges information with an automated quarantine enterprise configuration 350. Responsive to tenant requests, the automated quarantine manager 320 may automatically route the request to a default cluster 330 or quarantine cluster 340. As used herein, the term "automatically" may refer to a process that is performed with little or no human intervention.

As used herein, devices, including those associated with the system 300 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The automated quarantine manager 320 may store information into and/or retrieve information from various data stores (e.g., quarantine lists), which may be locally stored or reside remote from the automated quarantine manager 320. Although a single automated quarantine manager 320 and automated quarantine enterprise configuration 350 are shown in FIG. 3, any number of such devices may be included. Moreover, various devices described herein might be combined according to embodiments of the present invention. For example, in some embodiments, the automated quarantine manager 320 and automated quarantine enterprise configuration 350 might comprise a single apparatus. The system 300 functions may be performed by a constellation of networked apparatuses, such as in a distributed processing or cloud-based architecture.

An administrator may access the system 300 via a remote device (e.g., a Personal Computer ("PC"), tablet, or smartphone) to view information about and/or manage operational information in accordance with any of the embodiments described herein. In some cases, an interactive Graphical User Interface ("GUI") display may let an operator or administrator define and/or adjust certain parameters via the remote device (e.g., to define watermark thresholds, factors, indicators, etc.) and/or provide or receive automatically generated recommendations, alerts, or results associated with the system 300.

Figure 4:
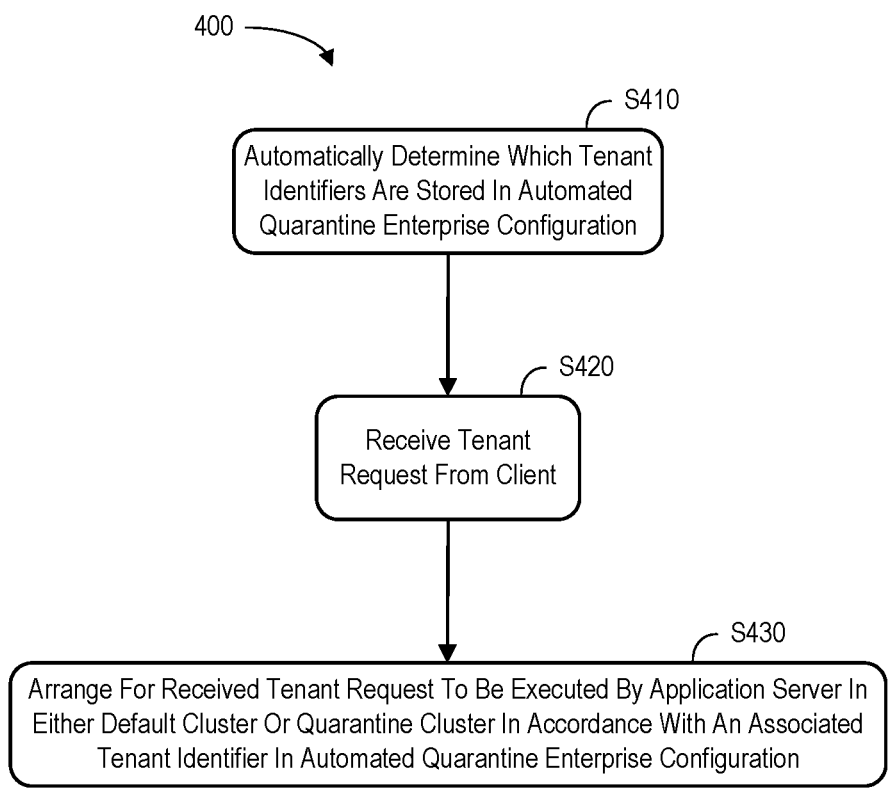
FIG. 4 is a request governance method in accordance with some embodiments.

FIG. 4 is a request governance method 400 that might be performed by some or all of the elements of the system 300 described with respect to FIG. 3. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S410, an automated quarantine manager may automatically determine which tenant identifiers are stored in an automated quarantine enterprise configuration (e.g., based on a dynamic sliding time window). For example, the system might automatically determine problematic tenants based on Central Processing Unit ("CPU") usage, memory utilization, Input Output ("IO") parameters, a response status, a response time, a database query count, a tenant quarantine rule, a Machine Learning ("ML") algorithm, etc. In some embodiments, the automated quarantine manager determines which tenant identifiers are stored in the automated quarantine enterprise configuration based on a dynamic sliding time window and/or a plurality of calculated factors (e.g., a tenant request ratio, a tenant request rate, a tenant error percentage, a tenant average response time, a tenant average memory usage, etc.). As described in connection with FIGS. 11 through 15, each of the plurality of calculated factors is associated with a high watermark threshold and a low watermark threshold, an indictor weight may be applied for each the calculated factors, and/or a quarantine threshold and a release threshold may be implemented.

At S420, a tenant request may be received from a client. At S430, the system may arrange for the received tenant request to be executed by an application server in either a default cluster or a quarantine cluster in accordance with an associated tenant identifier in the automated quarantine enterprise configuration. According to some embodiments, the automated quarantine manager may further determine when a tenant identifier is to be released from the automated quarantine enterprise configuration. Moreover, in some embodiments the arranging for the received tenant request to be executed is further based on an auto-quarantine enable flag.

In this way, a multi-tenancy architecture may quickly and accurately prevent system service degradation from being caused by an abnormal tenant (providing a gateway layer solution for request governance). Rules may determine whether a tenant should be quarantined (based on historical cases). Embodiments may update the rule to accept more complex situations (and the rule can also accept more input data to make it more accurate). After the tenant's problematic issue is resolved, the tenant can be moved back to default cluster automatically based on release quarantine rules (to provide more stable services for this tenant).

Figure 5:
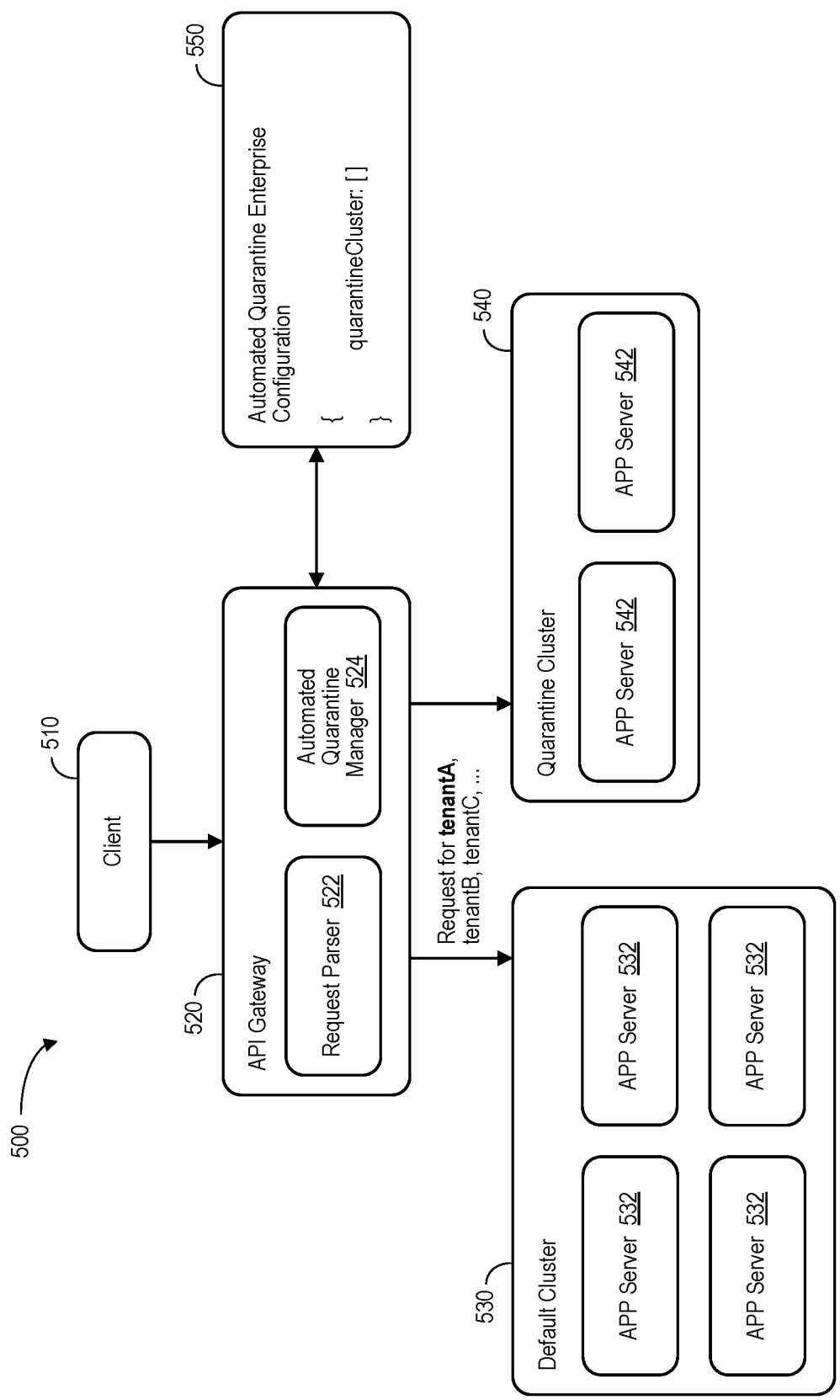
FIG. 5 illustrates an empty quarantine scenario according to some embodiments.

FIG. 5 illustrates an empty quarantine scenario 500 according to some embodiments. An API gateway 520 may receive an application request from a client 510. The API gateway 520 may comprise a component of an app-delivery infrastructure that sits between the client 510 and services and provides centralized handling of API communication between them. It may also deliver security, policy enforcement, and monitoring and visibility across on-premises, multi-cloud, and hybrid execution enterprise environments. The API gateway 520 may include a request parser 522 and an automated quarantine manager 524 and communicate with an automated quarantine enterprise configuration 550. In the example of FIG. 5, the automated quarantine enterprise configuration 550 is storing an indication that no tenants are currently flagged as being a problematic tenant (quarantineCluster: [ ]). As a result, client 510 requests associated with tenants A, B, and C are handled by application servers 532 in a default cluster 530 (and no requests are handled by servers 542 in a quarantine cluster 540). As used herein, an application "cluster" may comprise a group of loosely coupled machines networked together (e.g., sharing disk resources). In a cluster, multiple server machines may cooperate to provide a set of services or resources for the client 510. For example, clustering two or more servers 532, 542 to back up critical applications may be a cost-effective high availability option. In this scenario 500, the automated quarantine enterprise configuration 550 is empty, so when the client 510 sends a request for tenant A, the request parser 522 will parse the tenant name from request. Since tenant A is not in the automated quarantine enterprise configuration 550, the request is routed to the default cluster 530.

Figure 6:
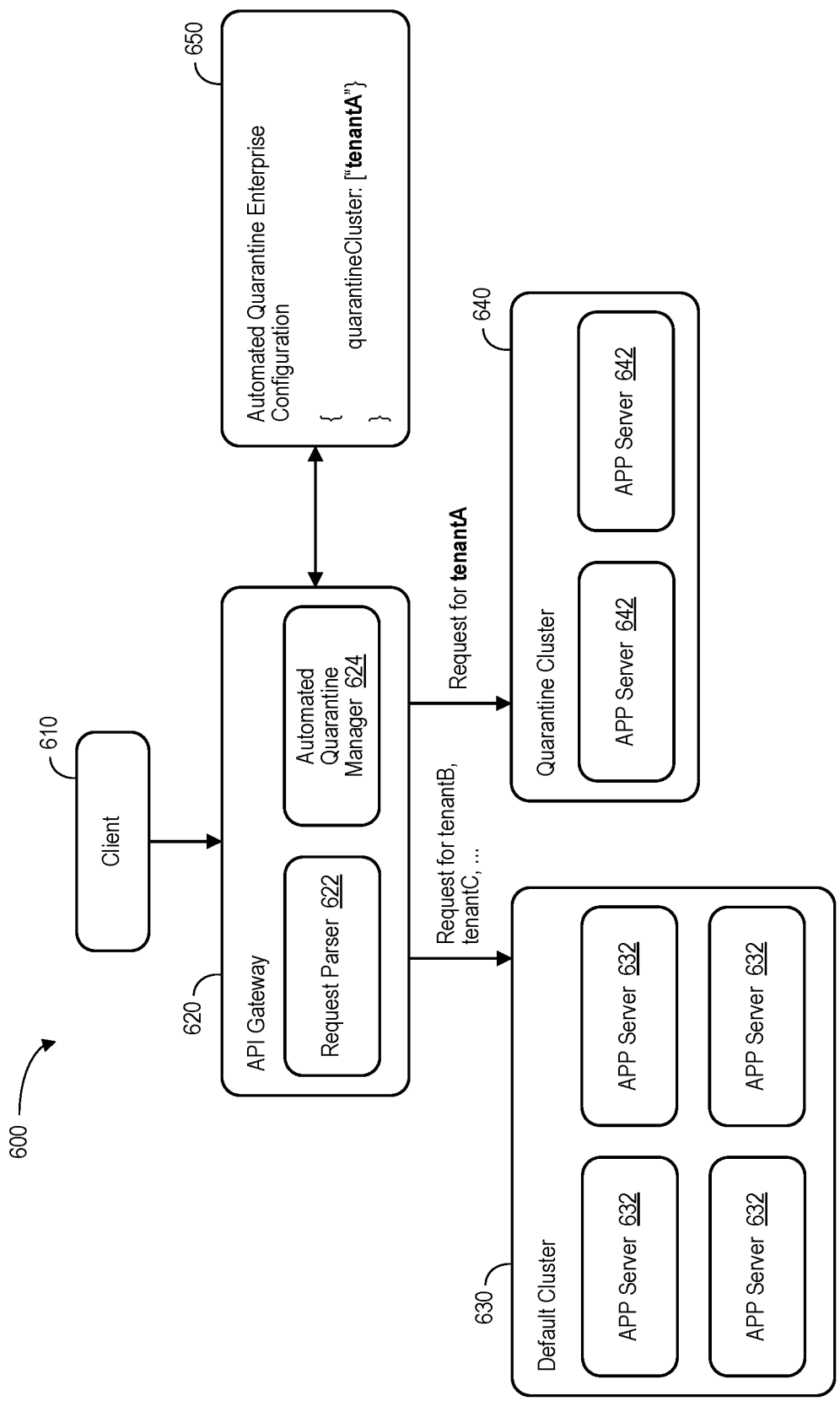
FIG. 6 is a scenario after tenant A has been moved into quarantine in accordance with some embodiments.

At some point, tenant A may be automatically determined to be problematic (e.g., as described in connection with FIGS. 11 through 15). FIG. 6 is a scenario 600 after tenant A has been moved into quarantine in accordance with some embodiments. An API gateway 620 may receive an application request from a client 610. The API gateway 620 may include a request parser 622 and an automated quarantine manager 624 and communicate with an automated quarantine enterprise configuration 650. In the example of FIG. 6, the automated quarantine enterprise configuration 650 is storing an indication that tenant A is currently flagged as being a problematic tenant (quarantineCluster: ["tenantA"]). As a result, client 610 requests associated with tenants B and C are handled by application servers 632 in a default cluster 630 and requests associated with tenant A are handled by servers 642 in a quarantine cluster 640. In this scenario 600, tenant A is unhealthy. The quarantine manager 624 adds tenant A into the automated quarantine enterprise configuration 650 list, and then read the automated quarantine enterprise configuration 650. As a result, the request for tenant A is be routed to the quarantine cluster 640.

Figure 7:
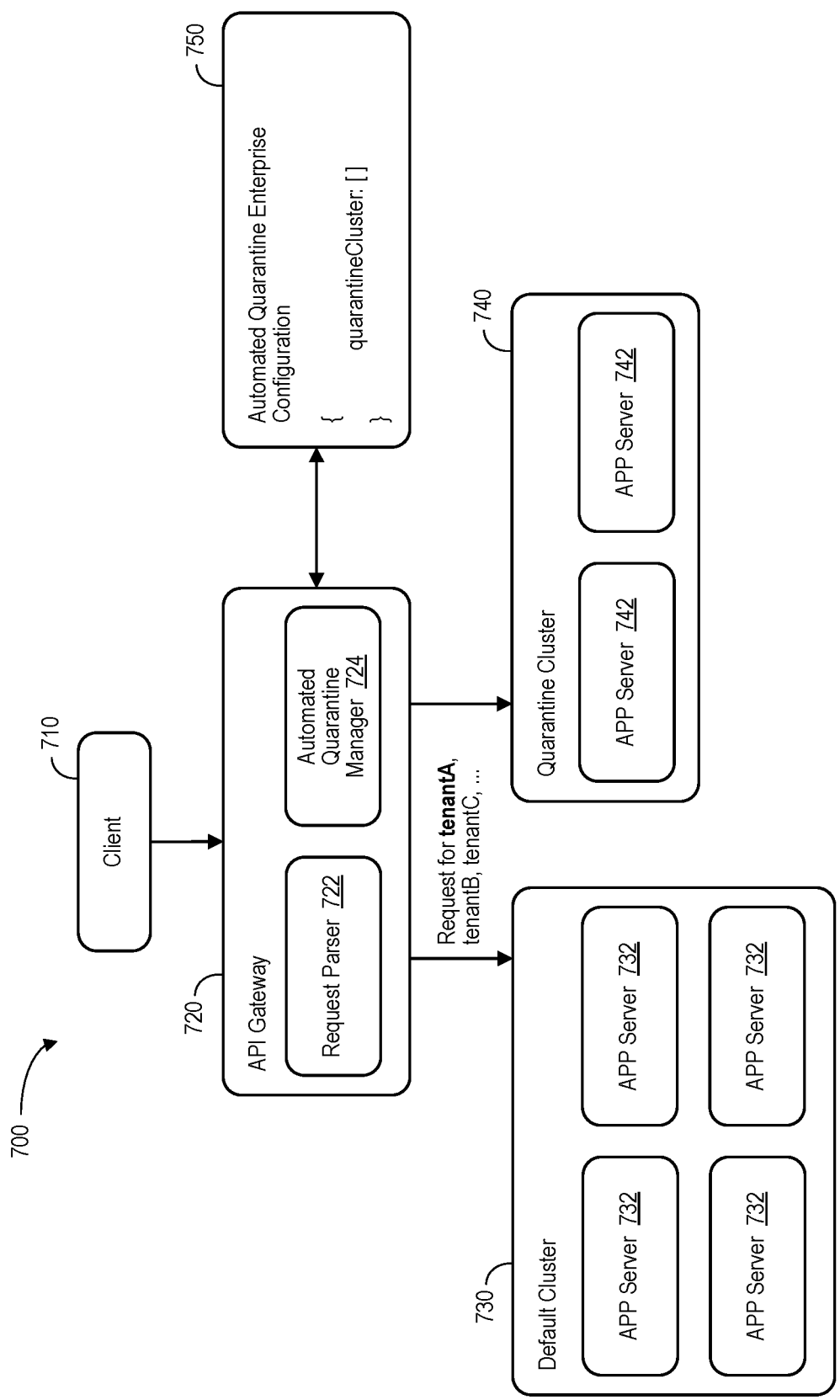
FIG. 7 is a is a scenario after tenant A has been removed from quarantine according to some embodiments.

Subsequently, tenant A may be automatically determined to be no longer problematic. For example, FIG. 7 is a is a scenario 700 after tenant A has been removed from quarantine according to some embodiments. An API gateway 720 may receive an application request from a client 710. The API gateway 720 may include a request parser 722 and an automated quarantine manager 724 and communicate with an automated quarantine enterprise configuration 750. In the example of FIG. 7, the automated quarantine enterprise configuration 750 is storing an indication that no tenants are currently flagged as being a problematic tenant (quarantineCluster: [ ]). As a result, client 710 requests associated with tenants A, B, and C are all handled by application servers 732 in a default cluster 730 (and no requests are handled by servers 742 in a quarantine cluster 740). In this scenario 700, the problem with tenant A has been solved and it is healthy. As a result, tenant A is unlocked and removed from the list by the quarantine manager 724. When the client 710 sends a request for tenant A, the request is again sent to the default cluster 730 (since tenant A is not in the quarantine list).

Figure 8:
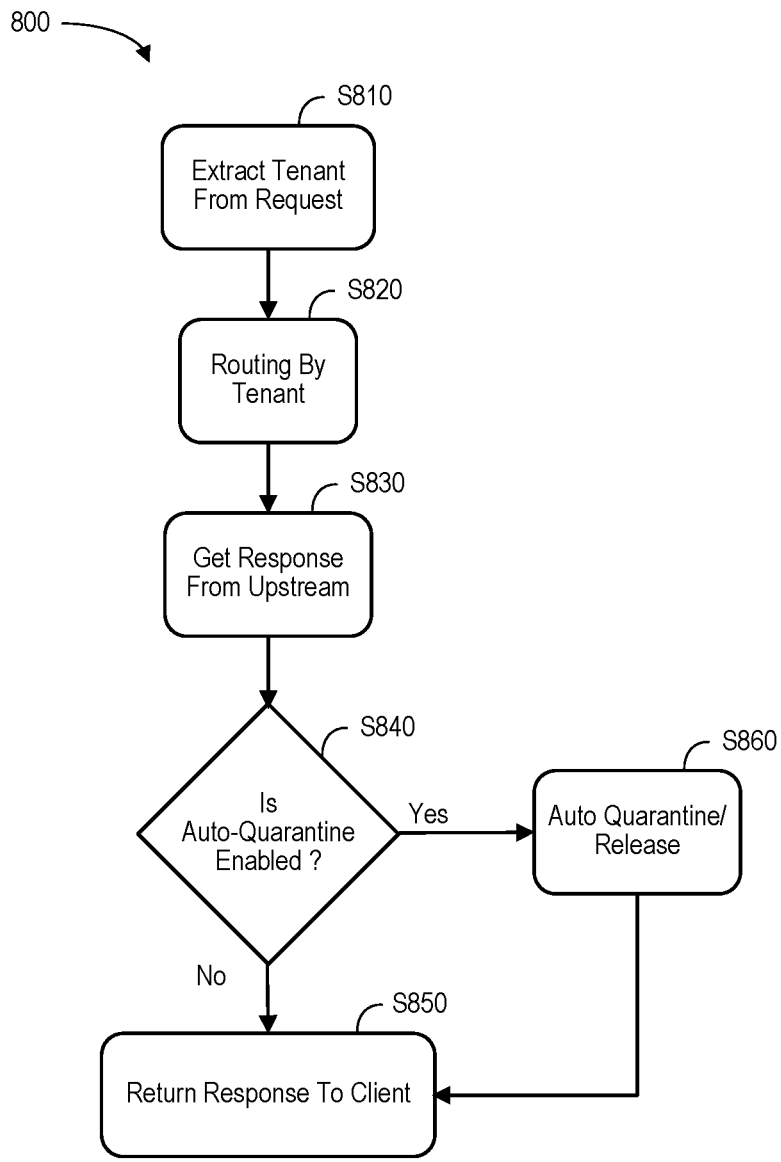
FIG. 8 is an overall automated request governance method in accordance with some embodiments.
Figure 9:
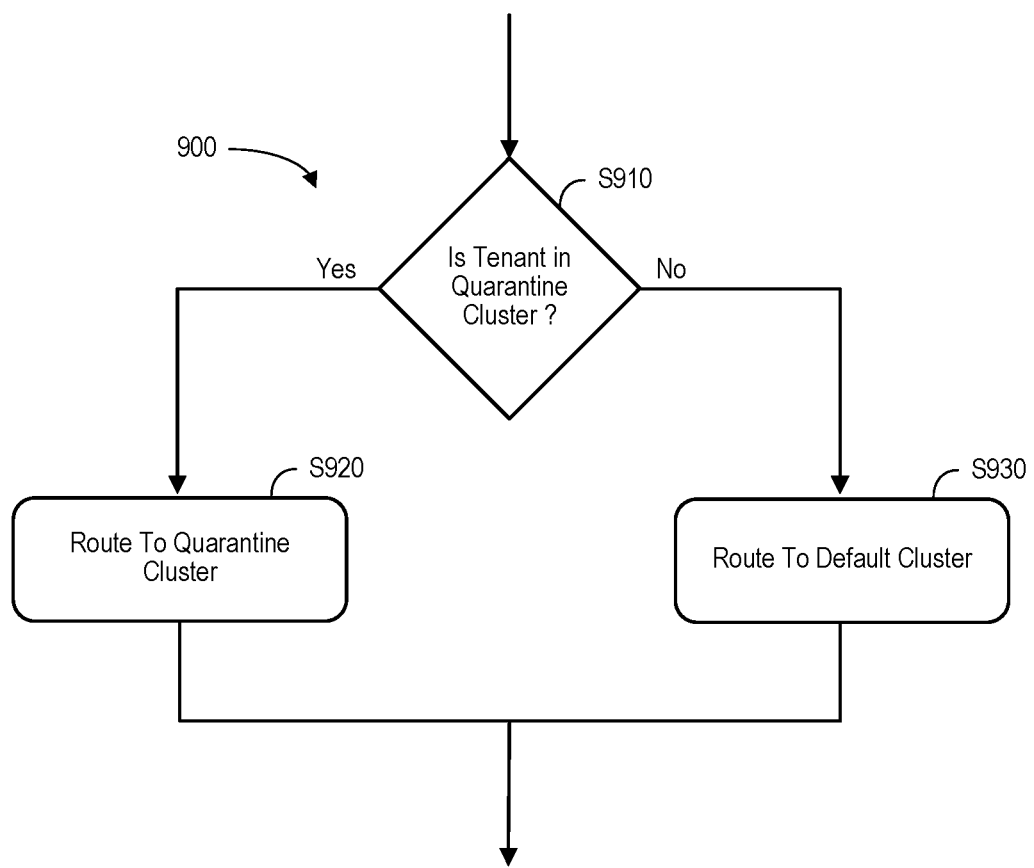
FIG. 9 is a routing by tenant method according to some embodiments.

FIG. 8 is an overall automated request governance method 800 in accordance with some embodiments. At S810, the system may extract a tenant identifier from a client request. At S820, routing by tenant is performed as described in connection with FIG. 9. In particular, FIG. 9 is a routing by tenant method 900 according to some embodiments and if the tenant associated with the request is not in quarantine at S910 it is routed to the default cluster at S930. If the tenant associated with the request is in quarantine at S910, it is instead routed to the quarantine cluster at S920. Referring again to FIG. 8, the response from upstream is received at S830 and, if auto-quarantine is not enabled at S840, that response is simply returned to the client at S850. The "auto-quarantine" might comprise, for example, a flag that can be enabled (or disabled) by an operational team manually (e.g., to inhibit functionality associated with various embodiments described herein during troubleshooting, problem investigations, etc.). In other embodiments, the flag may be enabled (or disabled) automatically based on a cluster status (CPU load, memory, etc.). If auto-quarantine is enabled at S840, an automated quarantine and release process is performed at S860 as described in connection with FIG. 10.

Figure 10:
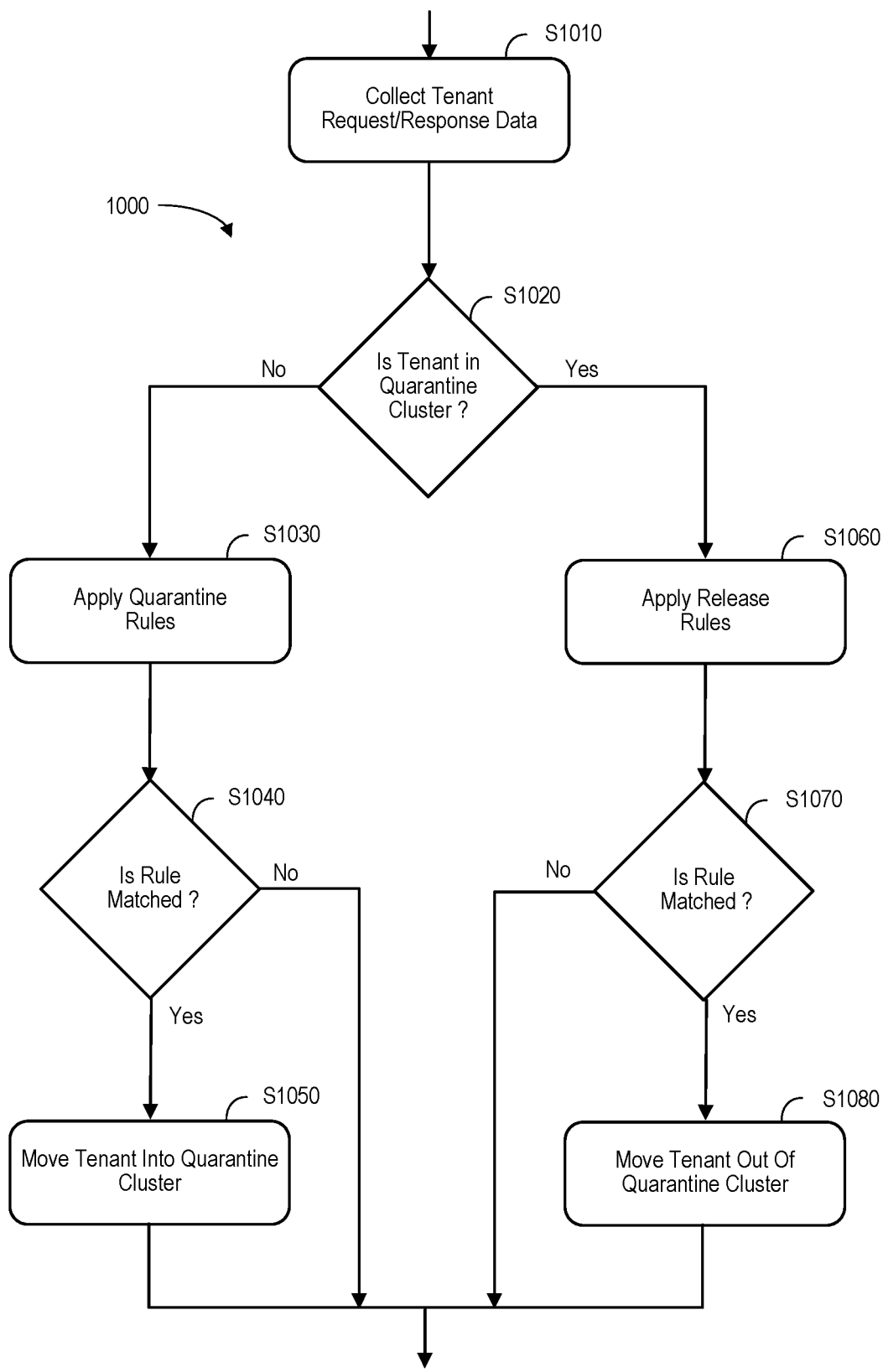
FIG. 10 is an automated quarantine/release method in accordance with some embodiments.

FIG. 10 is an automated quarantine/release method 1000 in accordance with some embodiments. The system may collect tenant request and/or response data at S1010 (which will be used to perform automatic quarantine categorization). Besides the normal response data (e.g., response status, response time, etc.), an application might provide additional data (e.g., CPU load, memory consumption, a database query count, etc.) and more accurate quarantine judgements may be made based on that additional data. If the tenant is not currently in a quarantine cluster at S1020, quarantine rules are applied at S1030 and, if the rule is not matched at S1040 (that is, the tenant is not problematic), the process ends. If the rule is matched at S1040 (that is, the tenant is problematic), the tenant is moved or migrated into the quarantine cluster at S1050. If the tenant is currently in a quarantine cluster at S1020, release rules are applied at S1060 and, if the rule is not matched at S1070 (that is, the tenant is still problematic), the process ends. If the rule is matched at S1070 (that is, the tenant is no longer problematic), the tenant is moved or migrated out of the quarantine cluster at S1080 (that is, into the default cluster).

Figure 11:
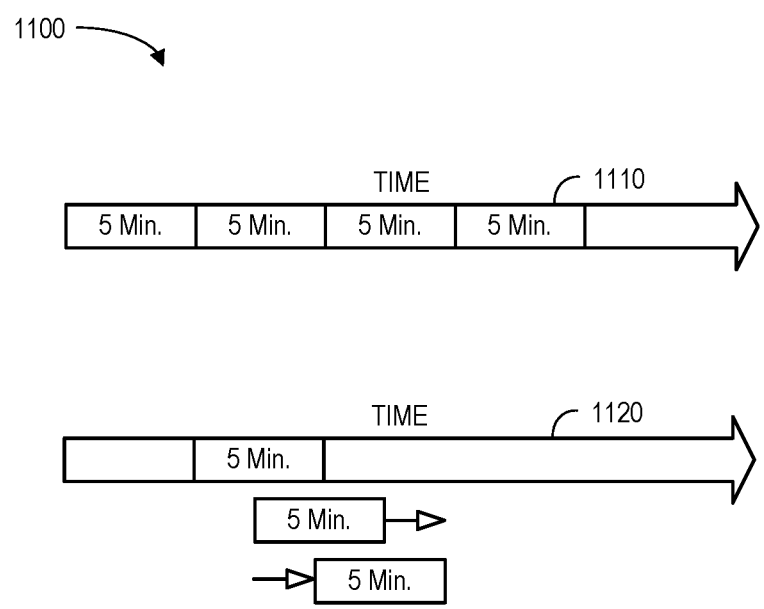
FIG. 11 illustrates time windows according to some embodiments.

With respect to the automated quarantine and release rules, in some embodiments a dynamic sliding time window may be used to quickly determine whether a tenant is in a problematic status. The length of the sliding window may be configurable, such as five minutes, ten minutes, etc. For example, FIG. 11 illustrates time windows 1100 according to some embodiments. In particular, the windows 1100 include a normal static time window 1110 where a series of five minute sections are sequentially arranged in a static fashion. In contrast, the dynamic sliding window 1120 constantly moves to always reflect the most recent five minutes of collected data.

Figure 12:
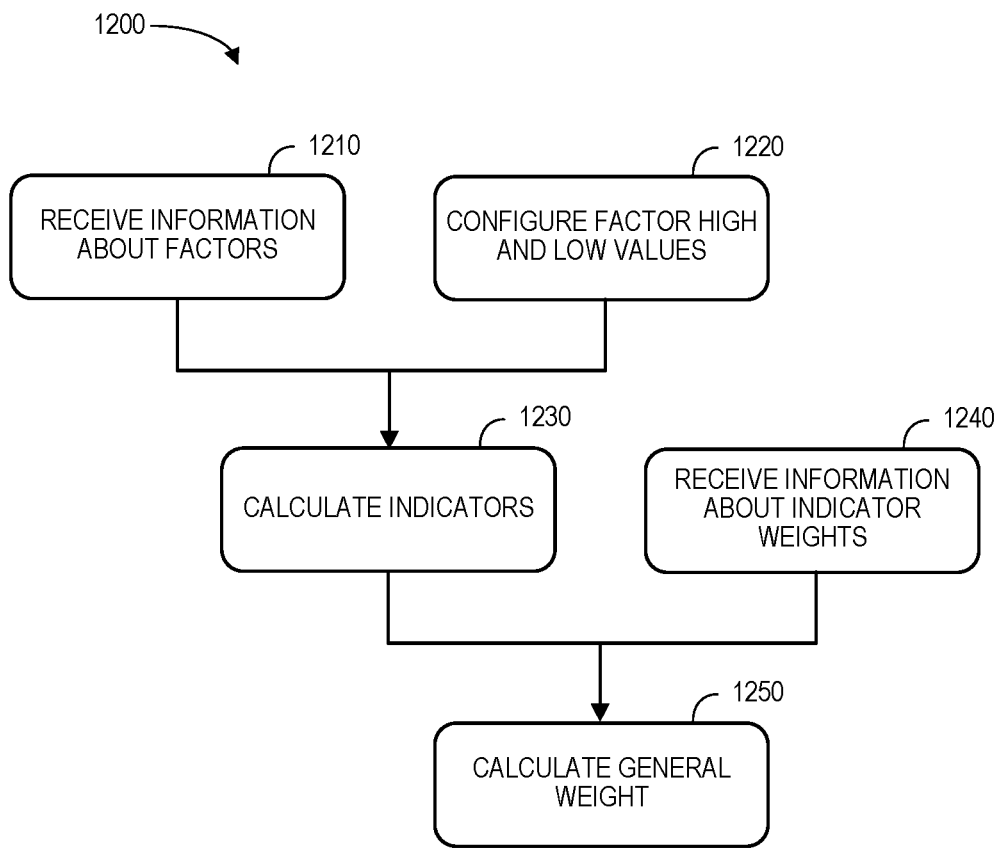
FIG. 12 is a process to calculate a general weight for a request in accordance with some embodiments.

With respect to quarantine and release rules, the overall approach may be to calculate multiple factors and indicators (as will be explained) and then calculate a general weight for each request. The system may then set and apply the rules. For example, FIG. 12 is an overall process 1200 to calculate a general weight for a request in accordance with some embodiments. The process 1200 first receives information about factors 1210 and configures factor high and low values 1220. Next, the process 1200 may calculate indicators 1230 and associated indicator weights 1240. Finally, this information may be used to determine a general weight 1250 associated with the request (e.g., indicating how problematic the request should be considered).

The information about factors received at 1210 may be based on data in a dynamic sliding window (e.g., the past five minutes). By way of example only, the factors may comprise values that are relatively easy to calculate. For other systems, different factors might be more appropriate (based on the system implementation whether it is easy to calculate the factors). In one embodiment, the following five factors may be calculated based on a dynamic sliding time window:

$$\text{tenantRequestRatio} = \frac{\text{tenantRequestNumber}}{\text{totalRequestNumber}} \times 100\%$$

$$\text{tenantRequestRate} = \frac{\text{tenantRequestNumber}}{\text{seconds of sliding window}}$$

$$\text{tenantErrorPercentage} = \frac{\text{tenantErrorResponseNumber}}{\text{totalRequestNumber}} \times 100\%$$

$$\text{tenantAvgResponseTime} = \frac{\sum \text{tenantResponseTime}}{\text{totalRequestNumber}}$$

$$\text{tenantAvgMemUsage} = \frac{\sum \text{tenantMemoryUsage}}{\text{totalRequestNumber}}$$

The system may then configure factor high watermark and low watermark values 1220. Note that the high watermark and low watermark values may be similar to thresholds. If a factor is greater than or equal to a "high watermark," it may mean that the factor is too high and can be considered as a potentially problematic value (e.g., which might indicate that other tenants will experience problems). If a factor is less than or equal to a "low watermark," it may mean that the factor is relatively small and can be considered safe (e.g., not problematic).

Note that different factors may have different high watermarks and low watermarks. Similarly, based on the software implementation and hardware configuration, different systems may have different high watermarks and low watermarks. Moreover, these values may also be configured and continuously adjusted based on system history.

By way of example only, the configuration of tenantRequestRatio might be defined as shown in Table 1:

TABLE 1

Sample Configuration of tenantRequestRatio

| tenantRe-questRatio | | Description |
| --- | --- | --- |
| Watermark_High | 50% | If tenantRequestRatio is greater than or equal to 50%, it is considered too high and other tenants may experience problems |
| Watermark_Low | 10% | If tenantRequestRatio is less than or equal to 10%, it is considered normal and factor does not need attention |

Figure 13:
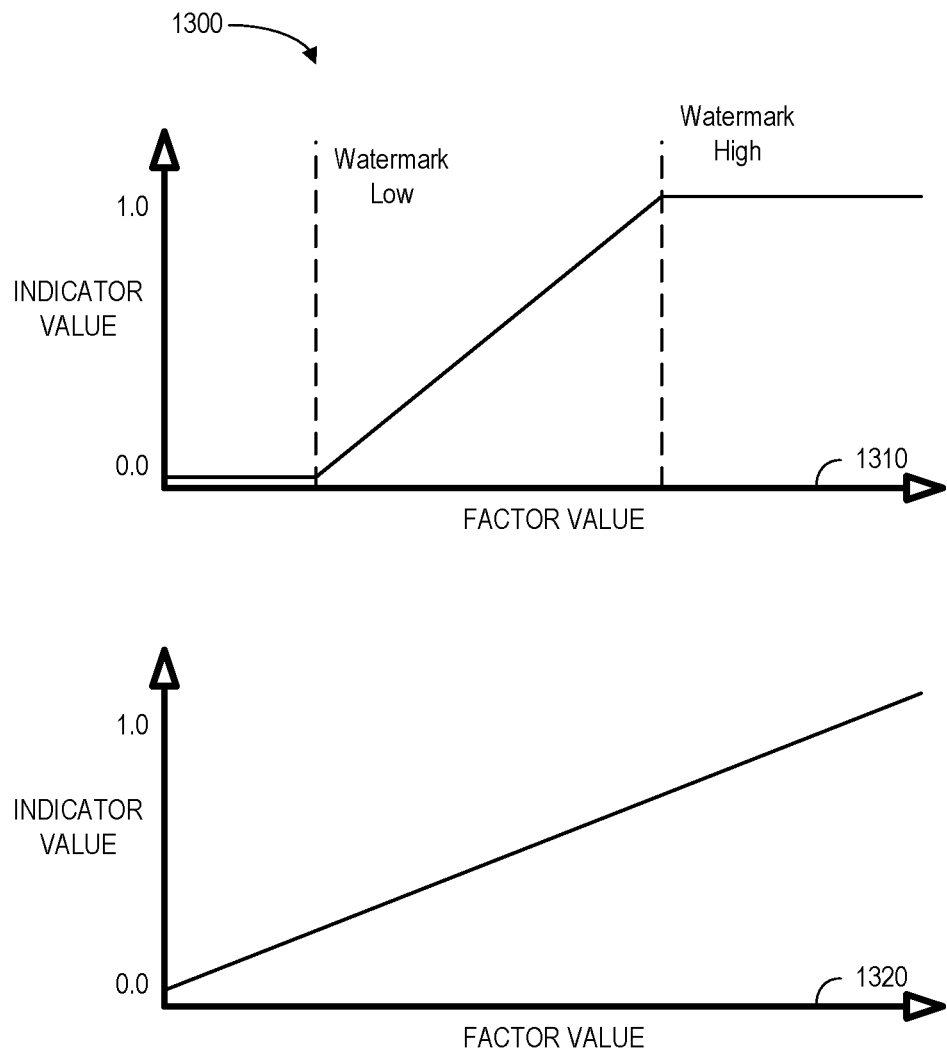
FIG. 13 illustrates indicator functions according to some embodiments.

At 1230, various indicator values may be calculated. For example, the following equation may be used to calculate an indicator value:

$$Ind(f) = \begin{cases} 0, & f \leq wm_{low} \\ \dfrac{f - wm_{low}}{wm_{high} - wm_{low}}, & wm_{low} < f < wm_{high} \\ 1, & f \geq wm_{high} \end{cases}$$

where f is the value of a factor and wm is a watermark (high or low). For example, FIG. 13 illustrates indicator functions 1300 according to some embodiments. In the first graph 1310, the indicator value is held to 0 when the factor value is below the watermark low. Similarly, the indicator value is held to 1 when the factor value is above the watermark high. In between the indicator values rises with the factor value. Continuing to tenantRequestRatio as an example, if tenantRequestRatio is 30%, then the indicator value is (30%−10%)/(50%−10%) which equals 0.5. A second graph 1320 illustrates a similar approach (without high or low watermarks), where the indicator value simply rises along with the factor value.

At 1240, the system may receive information about indicator weights. According to some embodiments, indicator weights might be based on an ability of the software, hardware, or history data. The configuration may also be adjusted (that is, more factors may be added for more indicators as appropriate).

Figure 14:
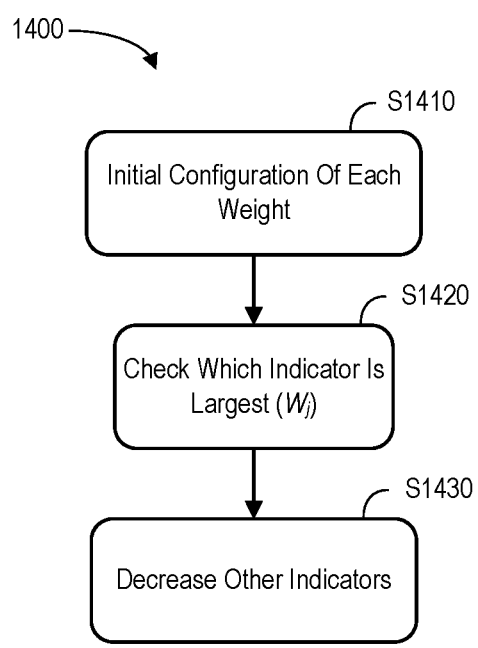
FIG. 14 is an automated continuous improvement configuration in accordance with some embodiments.

According to some embodiments, an auto-continuous improvement configuration may be implemented. FIG. 14 is an automated continuous improvement configuration 1400 in accordance with some embodiments. At S1410, the system may determine an initial configuration of each weight. For example, the initial configuration of each weight might be $$\frac{1}{n}, 0 \leq w_i \leq 1, \text{ and} \sum_{i=1}^{n} w_i = 1.$$

Once a tenant is moved to the quarantine cluster, the system may check which indicator is the largest at S1420, such as $\max(Ind_i) = Ind_j$. In this case, the system may increase $W_j$ by a configured constant c (0<c<1). Moreover, other indicators may be decreased at S1430 by $$\frac{c}{n-1}.$$

In other words:

$$w_j = w_j + c$$

$$w_i = w_i - \frac{c}{n-1} (i \neq j)$$

The following are some steps that might be used to implement such a process:

If $W_j + c \leq 1$
   $W_j = W_j + c$

If each $W_i = \frac{c}{n-1} \geq 0$ $W_i = W_i - \frac{c}{n-1}$

Else

Check the number $k$ of how many $W_i - \frac{c}{n-1} > 0$ $W_i = W_i - \frac{c}{k}$ Else
   $W_{jold} = W_j$
   $W_j = 1$ If each $W_i = \frac{1 - W_{jold}}{n-1} \geq 0$ $W_i = W_i - \frac{1 - W_{jold}}{n-1}$ Else Check the number $k$ of how many $W_i - \frac{1 - W_{jold}}{n-1} > 0$ $W_i = W_i - \frac{1 - W_{jold}}{k}$ The indicator values and weights for a request might be arranged at 1230 and 1240 as described in Table 2:

TABLE 2

Indicator Values and Weights

| Indicator | Factors | Weight |
|---|---|---|
| $Ind_1$ | tenantRequestRatio (percentage) | $W_1$ |
| $Ind_2$ | tenantRequestRate (number per second, e.g., 1,000/second) | $W_2$ |
| $Ind_3$ | tenantErrorPercentage (percentage) | $W_3$ |
| $Ind_4$ | tenantAvgResponseTime (in seconds, e.g., 30 seconds) | $W_4$ |
| $Ind_5$ | tenantAvgMemUsage (in bytes, e.g., 40 KB or 20 MB) | $W_5$ |

Finally, when all of the indicator values and weights have been determined, the system can calculate the general weight of each request:

$$W_{tenant} = \sum_{i=1}^{n} Ind_i \times w_i$$

As one example of indicator values and weights (and then a calculation of the tenant weight)), consider Table 3:

TABLE 3

Indicator Values and Weights

| Indicator | Indicator Value | Weight | Weight Value | Tenant Weight |
|---|---|---|---|---|
| $Ind_1$ | 0.3 | $W_1$ | 0.3 | 0.37 |
| $Ind_2$ | 0.2 | $W_2$ | 0.1 | |
| $Ind_3$ | 0.35 | $W_3$ | 0.4 | |
| $Ind_4$ | 0.5 | $W_4$ | 0.1 | |
| $Ind_5$ | 0.7 | $W_5$ | 0.1 | |

Figure 15:
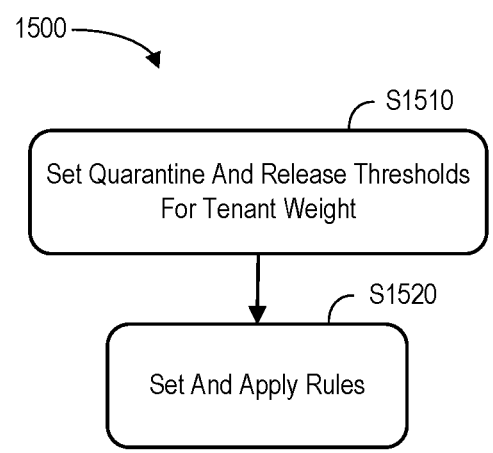
FIG. 15 is a rule application method according to some embodiments.

FIG. 15 is a rule application method 1500 according to some embodiments. At S1510, the system may set the thresholds for a tenant weight. The thresholds might include, for example:

A quarantine_threshold (if the tenant weight is greater than or equal to this threshold, then the the tenant is in a problematic state); and A release_threshold (if the tenant weight is less than or equal to this threshold, then the tenant has returned to a healthy, non-problematic state.

These two thresholds might be set, according to some embodiments, by history data. Note that different systems may experience variations in extreme statuses such as high CPU, high heap, high thread count, long response time, etc. After investigation by an operational team and/or engineers, an enterprise might move some tenants to a quarantine cluster and then find the root cause. Before turning "auto-quarantine" on, the history data can be collected and indicators (and tenant general weights) can be calculated. Based on the history data, the system may set or adjust the quarentine_threshold and/or release_threshold. The system may then set and apply the rules at S1520. For example, when the system determines that $w_{tenant} \geq$ quarantine_threshold, a tenant request might be moved to a quarantine cluster. When the system determines that $w_{tenant} \leq$ release_threshold, a tenant request might be moved out of the quarantine cluster.

In this way, embodiments may provide automated request governance in a multi-tenancy cloud computing environment.

Figure 16:
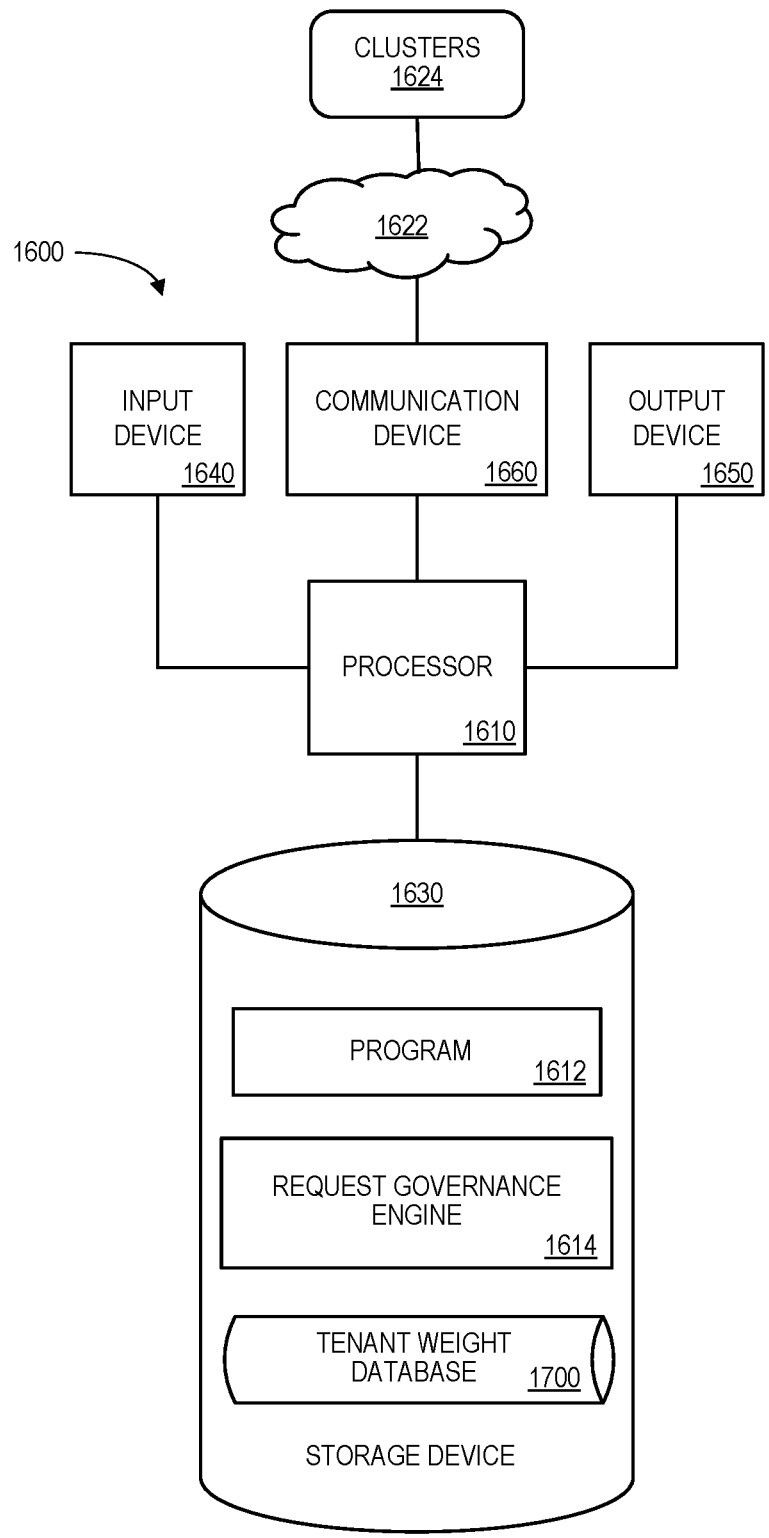
FIG. 16 is an apparatus or platform according to some embodiments.

Note that the embodiments described herein may be implemented using any number of different hardware configurations. For example, FIG. 16 is a block diagram of an apparatus or platform 1600 that may be, for example, associated with the systems 300 and scenarios 500 of FIGS. 3 and 5, respectively (and/or any other system described herein). The platform 1600 comprises a processor 1610, such as one or more commercially available Central Processing Units ("CPUs") in the form of one-chip microprocessors, coupled to a communication device 1660 configured to communicate via a communication network (not shown in FIG. 16). The communication device 1660 may be used to communicate, for example, with one or more clusters 1624 (e.g., via a communication network 1622), system administrators, etc. The platform 1600 further includes an input device 1640 (e.g., a computer mouse and/or keyboard to input, create and/or manage request governance information) and/or output device 1650 (e.g., a computer monitor to render a display, transmit recommendations, and/or create reports about clusters, quarantine rules, release rules, etc.). According to some embodiments, a mobile device and/or PC may be used to exchange information with the platform 1600.

The processor 1610 also communicates with a storage device 1630. The storage device 1630 may comprise any appropriate information storage device, including combinations of magnetic storage devices (e.g., a hard disk drive), optical storage devices, mobile telephones, and/or semiconductor memory devices. The storage device 1630 stores a program 1612 and/or request governance engine 1614 for controlling the processor 1610. The processor 1610 performs instructions of the programs 1612, 1614, and thereby operates in accordance with any of the embodiments described herein. For example, the processor 1610 may automatically determine which tenant identifiers are stored in the automated quarantine enterprise configuration. The processor 1610 may also receive a tenant request from a client and arrange for the received tenant request to be executed by an application server in either the default cluster or the quarantine cluster (in accordance with an associated tenant identifier in the automated quarantine enterprise configuration).

The programs 1612, 1614 may be stored in a compressed, uncompiled and/or encrypted format. The programs 1612, 1614 may furthermore include other program elements, such as an operating system, clipboard application, a database management system, and/or device drivers used by the processor 1610 to interface with peripheral devices.

As used herein, information may be "received" by or "transmitted" to, for example: (i) the platform 1600 from another device; or (ii) a software application or module within the platform 1600 from another software application, module, or any other source.

In some embodiments (such as the one shown in FIG. 16), the storage device 1630 further stores a tenant weight database 1700. An example of a database that may be used in connection with the platform 1600 will now be described in detail with respect to FIG. 17. Note that the database described herein is only one example, and additional and/or different information may be stored therein. Moreover, various databases might be split or combined in accordance with any of the embodiments described herein.

Referring to FIG. 17, a table is shown that represents the tenant weight database 1700 that may be stored at the platform 1600 according to some embodiments. The table may include, for example, entries associated with tenant requests received in a cloud computing environment. The table may also define fields 1702, 1704, 1706, 1708, 1710 for each of the entries. The fields 1702, 1704, 1706, 1708, 1710 may, according to some embodiments, specify an indicator 1702, an indicator value 1704, a weight 1706, weight value 1708, and a tenant weight 1710. The tenant weight database 1700 may be created and updated, for example, when new indicators are added, when new sliding window data is received about tenants, etc.

The indicator 1702 might be a unique alphanumeric label that is associated with a performance metric associated with a tenant in a cloud computing environment and the indicator value 1704 might indicate how that tenant (or application) is currently performing. The weight 1706 and weight value 1708 might be associated with any of the embodiments described herein, and the tenant weight 1710 might be used to decide whether or not that tenant is (or is not) currently experiencing problematic tendencies with respect to other tenants of the enterprise.

Figure 18:
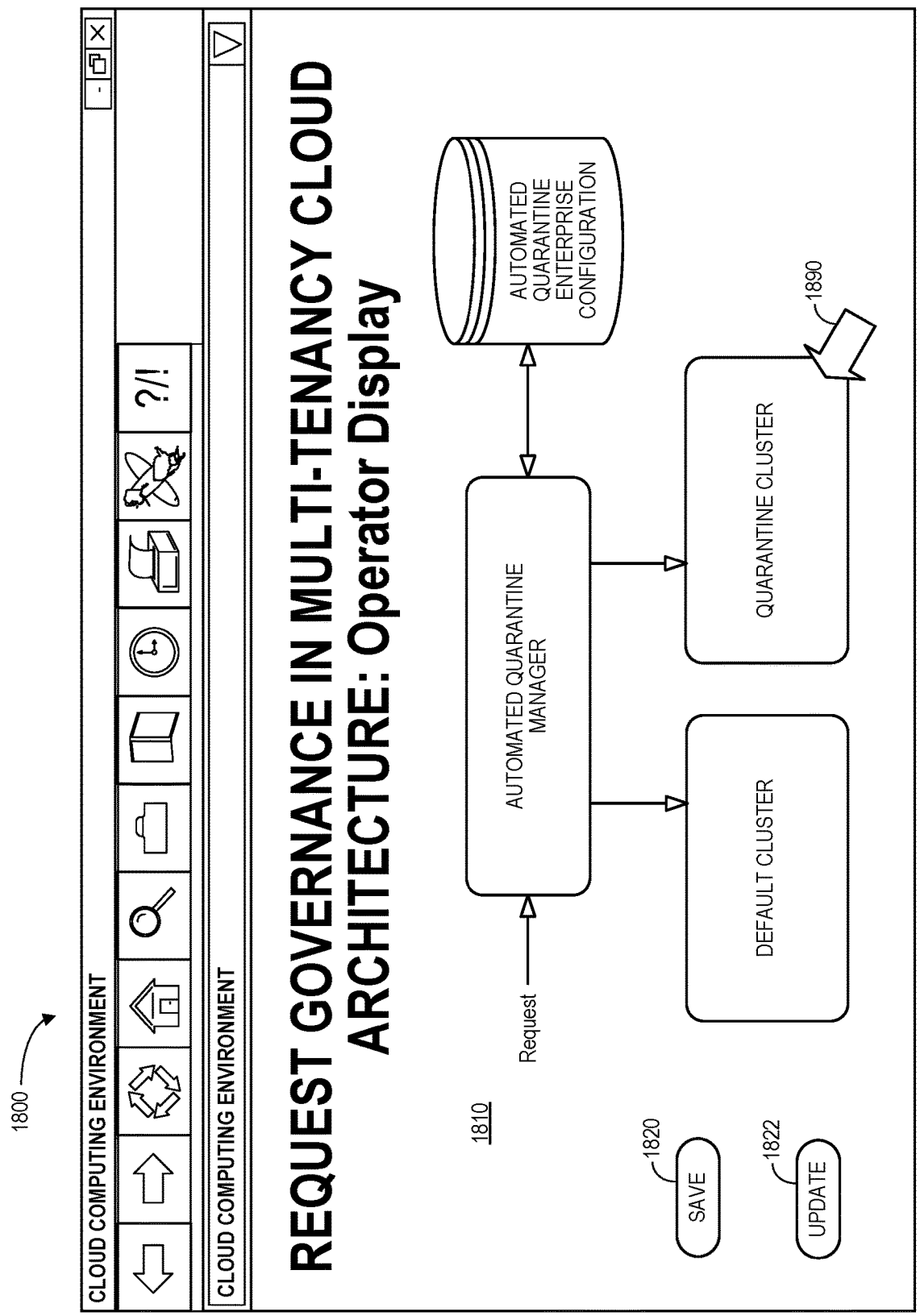
FIG. 18 is a request governance operator display in accordance with some embodiments.

FIG. 18 is a request governance operator or administrator display 1800 according to some embodiments. The display 1800 includes a graphical representation 1810 or dashboard that might be used to implement automated request governance for an enterprise (e.g., for a multi-tenant cloud computing environment). In particular, selection of an element (e.g., via a touchscreen or computer mouse pointer 1890) might result in the display of a popup window that contains more detailed data. The display 1800 may also include a user selectable "Save" icon 1820 to store configurations and/or system mappings (e.g., to a particular automated quarantine enterprise configuration data store) and an "Update" icon 1822 to adjust values as appropriate.

Thus, embodiments may provide several benefits, including the determination of a problematic tenant and placing it into quarantine cluster immediately without impacting other tenant customers. Embodiments may also provide rule-based request governance in the gateway layer with automated quarantine identification of problematic tenants. For example, the problematic tenant may be discovered and quarantined automatically without human interference which can substantially improve the efficiency and problem solving. Moreover, only the problematic tenant is impacted, all the other customers don't even perceive the server problem (improving service stability).

Figure 19:
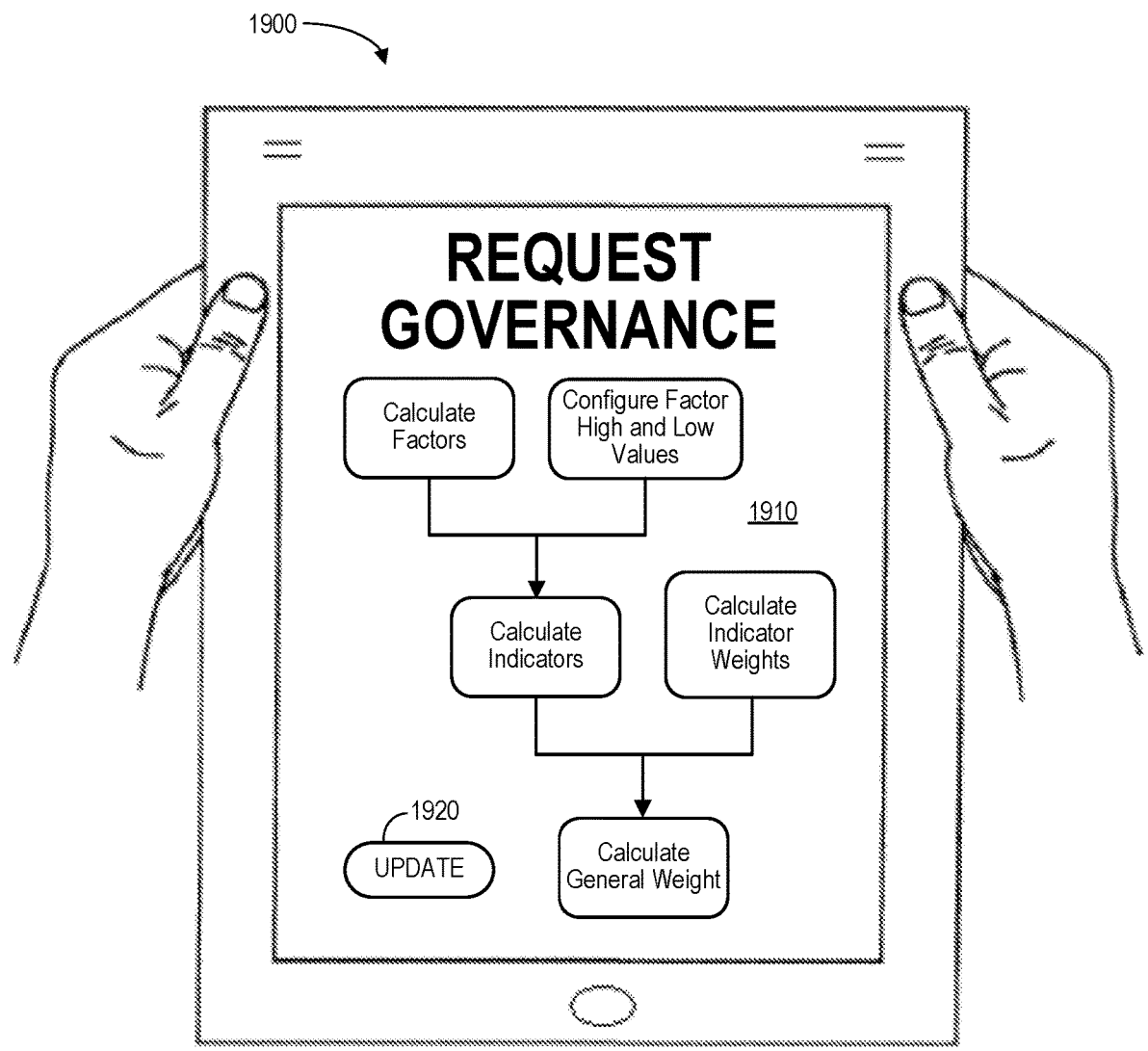
FIG. 19 illustrates a tablet computer according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of factors, any of the embodiments described herein could be applied to other types of application behaviors. Moreover, the displays shown herein are provided only as examples, and any other type of user interface could be implemented. For example, FIG. 19 illustrates a tablet computer 1900 providing a request governance display 1910 according to some embodiments. The display 1910 might be used, for example, to configure factors, indicators, weights, etc. for a cloud computing environment. Moreover, the display 1910 might be used to update and/or create request governance values via an "Update" icon 1920.

Figure 20:
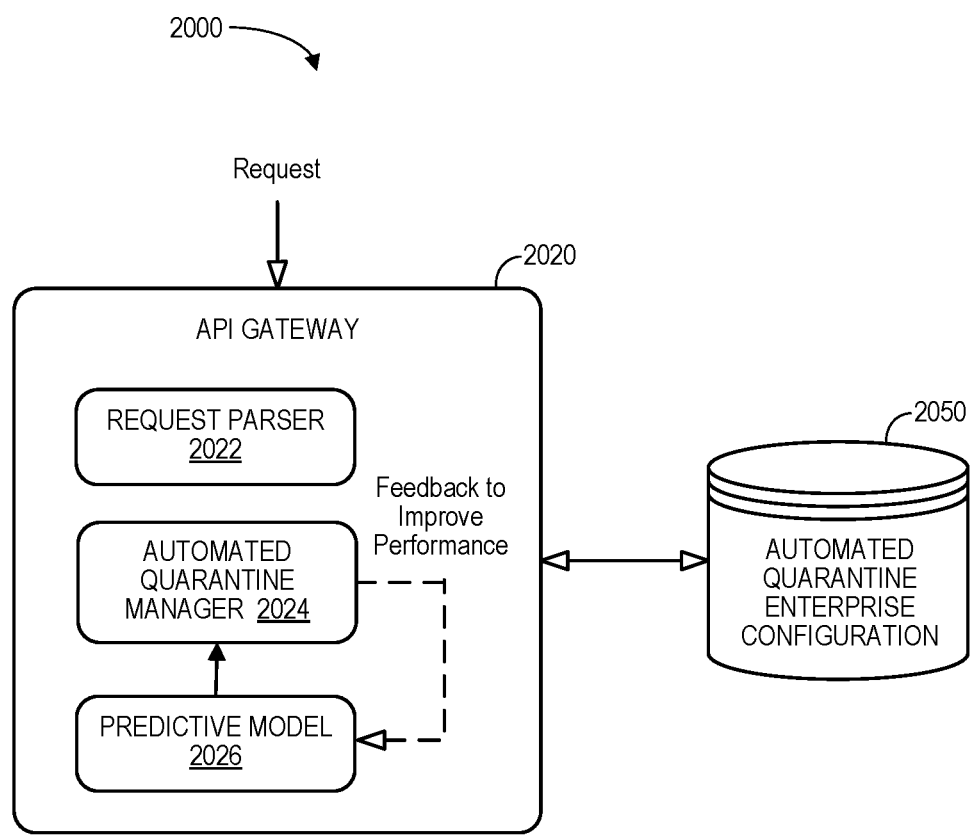
FIG. 20 is a high-level block diagram associated with a machine learning system according to some embodiments.

FIG. 20 is a high-level block diagram associated with a machine learning system 2000 according to some embodiments. Here, an API gateway 2020 and request parser 2022 may include an automated quarantine manager 2024 that updates an automated quarantine enterprise configuration 2050 based on a predictive model 2026. The predictive model 2026 might, for example, predict which tenants are likely to exhibit problematic behavior in the future based on any of the calculations described herein. Moreover, the predictive model 2026 may receive feedback from the automated quarantine manager 2024 to adjust predictions and thus improve future performance.

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system to provide request governance in a multi-tenancy cloud computing environment of an enterprise, comprising:

a default cluster to execute application servers;

a quarantine cluster to execute application servers;
an automated quarantine enterprise configuration storing automatically managed tenant identifiers; and
an automated quarantine manager coupled to the automated quarantine enterprise configuration, including:
a computer processor, and
a computer memory storing instructions that, when executed by the computer processor, cause the automated quarantine manager to:
automatically determine which tenant identifiers are stored in the automated quarantine enterprise configuration based on a dynamic sliding time window,
receive a tenant request from a client, and
arrange for the received tenant request to be executed by an application server in either the default cluster or the quarantine cluster in accordance with an associated tenant identifier in the automated quarantine enterprise configuration.

2. The system of claim 1, wherein the automated quarantine manager is further to determine when a tenant identifier is to be released from the automated quarantine enterprise configuration.

3. The system of claim 1, wherein the automated quarantine manager determines which tenant identifiers are stored in the automated quarantine enterprise configuration based at least in part on at least one of: (i) Central Processing Unit ("CPU") usage, (ii) memory utilization, (iii) Input Output ("IO") parameters, (iv) a response status, (v) a response time, (vi) a database query count, and (vii) a tenant quarantine rule.

4. The system of claim 3, wherein the automated quarantine manager determines which tenant identifiers are stored in the automated quarantine enterprise configuration based on a number of requests received from a tenant as compared to an overall number of requests that are received by the system.

5. The system of claim 3, wherein the automated quarantine manager determines which tenant identifiers are stored in the automated quarantine enterprise configuration based on a rate at which requests are received from a tenant during the dynamic sliding time window.

6. The system of claim 3, wherein the automated quarantine manager determines which tenant identifiers are stored in the automated quarantine enterprise configuration based on a number of error responses that occur as compared to a number of requests that are received from a tenant.

7. The system of claim 3, wherein the automated quarantine manager determines which tenant identifiers are stored in the automated quarantine enterprise configuration based on an average response time associated with a number of requests received from a tenant.

8. The system of claim 1, wherein the automated quarantine manager determines which tenant identifiers are stored in the automated quarantine enterprise configuration further based on a plurality of calculated factors.

9. The system of claim 8, wherein at least one of the calculated factors is based on: (i) a tenant request ratio, (ii) a tenant request rate, (iii) a tenant error percentage, (iv) a tenant average response time, and (v) a tenant average memory usage.

10. The system of claim 8, wherein each of the plurality of calculated factors is associated with a high watermark threshold and a low watermark threshold.

11. The system of claim 10, wherein the automated quarantine manager determines which tenant identifiers are stored in the automated quarantine enterprise configuration further based on an indictor weight for each the plurality of calculated factors.

12. The system of claim 11, wherein the automated quarantine manager determines which tenant identifiers are stored in the automated quarantine enterprise configuration further based on a quarantine threshold and a release threshold.

13. A computer-implemented method to provide request governance in a multi-tenancy cloud computing environment of an enterprise, comprising:
automatically determining, by a computer processor of an automated quarantine manager, which tenant identifiers are stored in an automated quarantine enterprise configuration based on a dynamic sliding time window;
receiving a tenant request from a client; and
arranging for the received tenant request to be executed by an application server in either a default cluster or a quarantine cluster in accordance with an associated tenant identifier in the automated quarantine enterprise configuration.

14. The method of claim 13, wherein the automated quarantine manager is further to determine when a tenant identifier is to be released from the automated quarantine enterprise configuration.

15. The method of claim 13, wherein the automated quarantine manager determines which tenant identifiers are stored in the automated quarantine enterprise configuration based at least in part on at least one of: (i) Central Processing Unit ("CPU") usage, (ii) memory utilization, (iii) Input Output ("IO") parameters, (iv) a response status, (v) a response time, (vi) a database query count, and (vii) a tenant quarantine rule.

16. A non-transitory, computer-readable medium storing instructions, that, when executed by a processor, cause the processor to perform a method to provide request governance in a multi-tenancy cloud computing environment of an enterprise, the method comprising:
automatically determining, by a computer processor of an automated quarantine manager, which tenant identifiers are stored in an automated quarantine enterprise configuration based on a dynamic sliding time window;
receiving a tenant request from a client; and
arranging for the received tenant request to be executed by an application server in either a default cluster or a quarantine cluster in accordance with an associated tenant identifier in the automated quarantine enterprise configuration.

17. The medium of claim 16, wherein the automated quarantine manager determines which tenant identifiers are stored in the automated quarantine enterprise configuration further based on a plurality of calculated factors.

18. The medium of claim 17, wherein at least one of the calculated factors is based on: (i) a tenant request ratio, (ii) a tenant request rate, (iii) a tenant error percentage, (iv) a tenant average response time, and (v) a tenant average memory usage.

19. The medium of claim 18, wherein each of the plurality of calculated factors is associated with a high watermark threshold and a low watermark threshold.

20. The medium of claim 19, wherein the automated quarantine manager determines which tenant identifiers are stored in the automated quarantine enterprise configuration further based on an indictor weight for each the plurality of calculated factors.

* * * * *